Feb. 6, 1951     A. H. MANKIN     2,540,827
SIGNAL DELAY DEVICE

Filed March 7, 1947

INVENTOR.
ARTHUR H. MANKIN
BY
Brown, Denk & Lynnestvedt
AGENTS

Patented Feb. 6, 1951

2,540,827

UNITED STATES PATENT OFFICE 2,540,827

SIGNAL DELAY DEVICE

Arthur H. Mankin, Philadelphia, Pa., assignor to Philco Corporation, Philadelphia, Pa., a corporation of Pennsylvania Application March 7, 1947, Serial No. 732,999

3 Claims. (Cl. 178—44)

This invention relates to an improved signal comparator for use in comparing the waveforms of successive portions of an electrical wave signal or for comparing the waveform of an electrical signal occurring at a given time with that of another signal occurring at a different time. It relates also to an improved signal delay device suitable for effectively delaying electrical signals for long intervals of time.

According to one known method of comparing the waveforms of signals occurring in time-spaced relation, the earlier signal is delayed in time by an amount sufficient to make it contemporaneous with the later signal. The delayed earlier signal is then subtracted from the later occurring signal, or vice versa, and any resultant signal is noted as indicative of a difference in waveform between the earlier and later signals.

The principal limitation upon this method is imposed by the magnitude of the time-spacing between the signals to be compared. Where only small time-spacings are involved, the required delay is rather readily obtainable through the use of conventional passive electrical delay networks employing either lumped or distributed parameters. However, when long delays (of the order of a millisecond or more) are required, these means are no longer suitable because of their inherent dissipation.

One method by which it has been attempted to secure greater delays involves the use of a column of a medium such as mercury suitable for the propagation of compression waves at supersonic frequencies. At one end of the column there are created in the medium (e. g. by means of a crystal transducer) disturbances at a relatively high frequency, whose amplitude is caused to vary in accordance with variations in the amplitude of the signal to be delayed. Thus there are propagated in the medium compression waves comprising successive condensations and rarefactions at the exciting frequency. These waves are transmitted through the column to the other end thereof, where they are again converted (e. g. by means of a second crystal transducer) into electrical signals corresponding in form to the signals originally used to set up the disturbances at the opposite end of the column but delayed in time with reference thereto. These signals will comprise a high frequency carrier modulated by a signal of waveform corresponding to that of the delayed input signal. The modulation may be detected in any well known manner and is then available for comparison with any contemporaneously occurring signal.

This arrangement is subject to the disadvantage, among others, that the crystal transducers employed must be maintained in extremely accurate alignment (i. e. the departure of their mechanical axes from parallelism preferably should not exceed one-half wavelength, at the frequency of the supersonic waves propagated in the medium, over a length equivalent to the separation between the crystals) in order that satisfactory pickup of the delayed signal may be obtained at the end of the column remote from the point of propagation. Such alignment is exceedingly difficult to maintain in practice, and it is required, therefore, that the arrangement be continually adjusted in order to insure satisfactory operation.

Accordingly the principal objects of the invention are as follows:

(1) to provide an improved signal waveform comparator requiring a minimum of adjustment in operation;

(2) to provide improved means for comparing the waveforms of electrical signals occurring in relatively large time-spaced relationship;

(3) to provide improved means for effectively delaying electrical signals for relatively long intervals of time without undue attenuation and without appreciable alteration in waveform;

(4) to provide an improved signal delay device in which the amount of delay is readily and conveniently adjustable throughout either small or large ranges;

(5) to provide an improved signal delay device comprising a column of a medium in which supersonic waves are propagated in response to signals to be delayed and signals are derived in response to disturbances in the medium at a point remote from that of propagation, said device requiring a minimum of adjustment of the means used to propagate said waves and the means used to derive said signals; and (6) to provide an improved signal delay device comprising a column of a light transmissive medium in which supersonic waves are propagated in response to signals to be delayed and in which optical means are employed to derive a signal in response to disturbances in the medium at a point remote from that of propagation.

Other objects and features of the invention will become apparent from a consideration of the following description and the appended claims.

According to the invention, supersonic compression waves are propagated in a column of a medium in the same manner as in the system just referred to. However, instead of mercury, water or some equivalent light-transmissive medium is employed. A beam of light is produced and is caused to traverse a region in the medium in the vicinity of the end of the column remote from that at which the waves are propagated. Upon emerging from the medium, the light beam is focused so that, in the absence of disturbances in the region of the medium through which it has passed, the emergent rays will be focused to impinge upon a stop. Disturbances propagated in the medium are, however, adapted to diffract the rays of the beam of light so as to cause a portion of the light to pass on either side of the stop. From the diffracted rays are selected, by means of a second stop provided with an aperture, only those rays which passed through a relatively limited region in the medium. The rays thus selected are permitted to impinge upon a photoelectric cell, whereby there are generated signals which vary in response to variations in the disturbances in the medium in the region through which the impingent rays have passed. The signals thus generated will be delayed versions of those in response to which disturbances in the medium were propagated.

It will be apparent that the invention can be practiced as briefly set forth above, using either light in the visible portion of the spectrum or, as well, light in the infra-red or ultra-violet regions, for example, which is invisible. Hence the term "light," used in the annexed claims, is to be construed as meaning either visible or invisible light.

A more complete understanding of the invention and of the mode of operation of a representative embodiment will be obtained by reading the following detailed description with reference to the accompanying drawings, in which.

Figure 1:
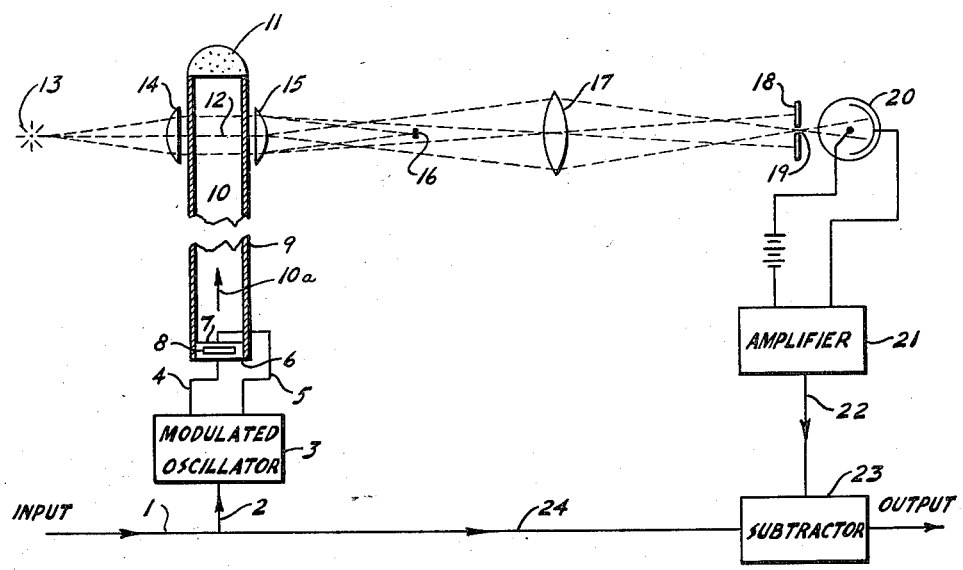
Figure 1 illustrates a representative embodiment of the invention.

Referring now to Figure 1, input signals are supplied through connections 1 and 2 to modulate an oscillator 3. These signals may comprise either a continuous signal, successive time-spaced portions of which are to be compared as to their waveform, or they may comprise discrete signals occurring in time-spaced relationship, whose waveforms are to be compared. Modulated oscillator 3 may comprise circuits of conventional form including a piezo-electric crystal 8 connected therein through connections 4 and 5 to its associated electrodes 6 and 7 respectively. The amplitudes of the oscillations generated by it are modulated in response to the input signals supplied to it through connection 2. The frequency of the oscillations generated by oscillator 3 should be sufficiently high to accommodate the sidebands which will be produced in response to modulation by the input signal. Thus, where the signal comparator is to be used in a radar target motion indicator, this frequency may be of the order of ten megacycles, and is determined by appropriate selection of the natural frequency of crystal 8 and of the magnitudes of the other components comprising the oscillator circuit, as is well known in the art.

Crystal 8 and its associated electrodes 6 and 7 are disposed at one end of a tubular container 9 which is conveniently made entirely of glass or some equivalent light transmissive material, although it is to be understood that only the upper portion of the container, through which light is to be transmitted, need be transparent. Hence it would be feasible to employ an opaque container having transparent windows appropriately disposed to permit the passage of a beam of light. The interior 10 of the container 9 is filled with a light transmissive medium, such as water, suitable for the propagation of supersonic compressional waves in response to the vibrations of crystal 8. These waves, which will vary in intensity in accordance with variations in the amplitude of the input signals, are propagated through the medium longitudinally of the tubular container 9 in the direction indicated by the arrow 10a. The end of the container opposite that at which the crystal is disposed is preferably terminated in an absorber 11 filled with a material such as cotton adapted to absorb the propagated waves and substantially prevent reflection thereof.

At any time after the first wave of a train propagated in response to vibrations of crystal 8 has traversed the length of the tubular container 9, there will be present along the entire length of the column of the propagating medium 10 within the tube, at any instant of time, a distribution of compressional disturbances (i. e. condensations and rarefactions) corresponding in their intensities to the amplitudes, at various instants, of the modulated carrier wave input to crystal 8 during the preceding interval of duration equal to the time required for a wave to travel the length of the tube. Thus, if the medium is water having a velocity of propagation of 1500 meters per second, a column 1.5 meters in length would comprise a train of condensations and rarefactions corresponding to variations in the input signal during the preceding millisecond. Those in the immediate vicinity of the crystal will correspond in intensity to the amplitude of the signal then being applied to the crystal, while those in the vicinity of the end of the column remote from the crystal will correspond to the amplitude of the signal applied one millisecond before.

If a ray of light is transmitted through the column of the propagating medium in a direction transverse to the direction of propagation, it is found that it is diffracted to a degree dependent upon the intensity of condensation or rarefaction in the plane through which it passes. This phenomenon is not in itself new but has previously been investigated and usefully applied, for example in a television receiving system as described in 27 proceedings of the Institute of Radio Engineers 483, et seq. The present invention utilizes the phenomenon to derive a signal dependent upon the degree of condensation or rarefaction in a particular plane in the medium transverse to the direction of propagation and having a predetermined displacement from the point at which waves are propagated. The signal thus derived is therefore dependent upon the amplitude of an input signal at a time prior by a predetermined amount to the time at which the signal is derived.

As illustrated in Figure 1, light from a suitable high intensity source 13, such as an arc discharge, is collimated by means of lens 14 to produce a parallel-ray-beam of light of convenient width, which is transmitted through the walls of container 9, and through the medium therein contained, in a direction transverse to the longitudinal axis of the container. The light source 13 and lens 14 are so arranged that some of the rays of the light beam shall lie in the plane 12, transverse to the axis of tube 9, in which occur the compressional disturbances in response to which an output signal is to be generated. Thus it may be arranged, for example, that the central rays of the beam traverse the medium in this plane. As hereinbefore mentioned this plane is displaced from the plane of propagation by an amount corresponding to the desired delay of the output signal with reference to the input signal in response to which the compression waves are propagated. The displacement determines the amount by which the output signal is delayed with reference to the input signal, and is limited only by the dissipation in the medium. For ten megacycle waves in water this dissipation amounts to about six decibels per meter, so that no particular problem is presented in obtaining delays of a millisecond or more.

For the purposes of the invention, only the rays of the beam passing through the medium in the immediate vicinity (e. g. within a fraction of a wavelength at the carrier frequency) of plane 12 are of interest. The reason for this will later become apparent. However it would not be feasible to limit the beam to such a narrow width, and hence a beam of any desired convenient width may be used, subsequent provision being made to restrict the information contained in the output signal to correspond to disturbances only in the immediate vicinity of the particular plane selected.

To increase the amount of light which is subject to diffraction in response to compressional disturbances in the vicinity of plane 12, the width of tube 9 may be increased in the direction transverse to the axis of the light beam, and lens 14 may be made of suitable form to distribute the light from source 13 in parallel rays in a beam of comparable width in this direction.

Upon emerging from the opposite wall of tube 9, the light comprising the beam passes through another lens 15. If the emergent rays are parallel, as will be the case if no disturbances exist in the region in the medium traversed by the beam, lens 15 is adapted to converge all of the light in the beam upon a stop 16. However, if disturbances exist in this region, some of the emergent rays will be diffracted and will not be intercepted by stop 16. These diffracted rays are focused by means of lens 17 to form, in the plane of stop 18, an image of the region of the wall of tube 9 from which the beam of light emerges. This image will comprise variations in light intensity throughout its length corresponding to variations in the amplitude of the disturbances within the region in the medium in tube 9 traversed by the light beam. More particularly the intensity in the center of the image will be a function of the disturbances existing in the region of plane 12 in the medium. Accordingly there is provided an aperture or slit 19 in stop 18 which is adapted to transmit only the light which has passed through the medium in the immediate vicinity of plane 12. This light is permitted to impinge upon the photoelectric cathode of photoelectric cell 20 to produce electrical signals which vary in intensity in response to variations in the intensity of disturbances in the vicinity of plane 12. These signals will therefore correspond to delayed versions of the input signal to the modulated oscillator 3. They are supplied through an amplifier 21 and connection 22 to a subtractor 23. The latter is also supplied with the undelayed input signals through connection 24. In the subtractor, which may be an ordinary amplifier, to the input of which the two signals are applied in opposite phase, the delayed output from amplifier 21 is subtracted from the undelayed output from connection 24, and in the event that these two signals are not substantially identical in waveform, the output from the subtractor will serve to indicate this fact.

Reference has already been made to the fact that only those rays of the light beam are of interest which traverse the medium in a limited region which extends but a fraction of a wavelength on either side of plane 12. Accordingly the width of aperture 19 should be made narrow enough to transmit to photocell 20 only these rays. If rays outside this limited region are permitted to reach the photocell, the output signal will not be related, as desired, to the amplitude of the input signal at a particular instant of time, but rather will be related to the average of the amplitude of the input signal during an interval whose duration is related to the width of the aperture. Although the exact width of the aperture, in any given instance, can best be determined by experiment, the best results appear to be obtainable when it is of sufficient width to pass the diffracted rays from a region in the medium which is less than one-half wavelength in width at the carrier frequency.

It will be apparent that lateral displacement of aperture 19 in stop 18 with reference to the optical axis of the system provides a convenient means of effecting small adjustments in the delay to which the input signal to the supersonic delay cell is subjected. Likewise it will be evident that larger variations in delay may be effected by displacement laterally of the axis of the optical system as a whole.

Figure 2:
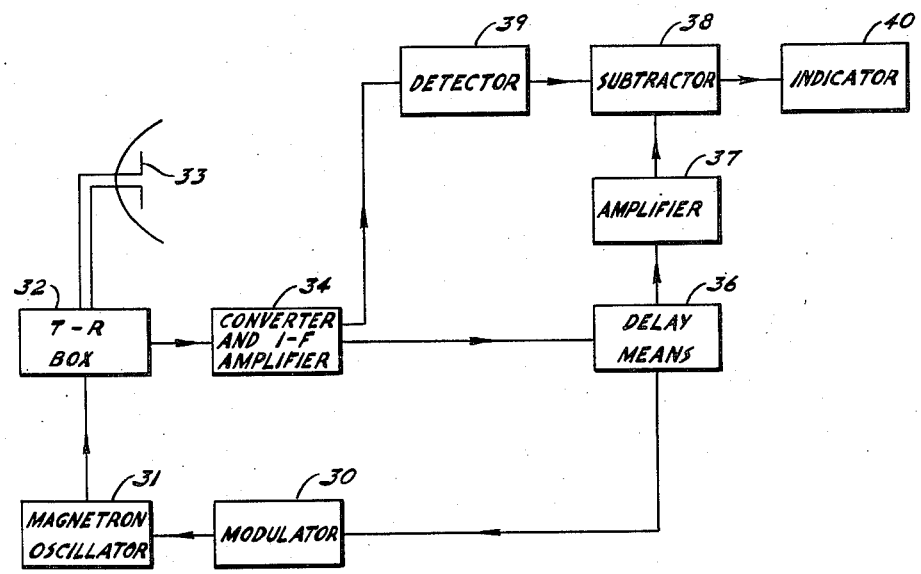
Figure 2 illustrates the application of the method and means of the invention to a radar target motion indicating system.

In Figure 2, which illustrates diagrammatically a complete radar target motion indicator system embodying a signal comparator in accordance with the invention, modulator 30 is adapted to generate time-spaced pulse signals which are supplied to magnetron oscillator 31 to control the generation of similar time-spaced pulses of radio frequency energy. These pulses are supplied through T-R box 32 to an antenna 33 for transmission. Reflections of the transmitted pulses from target objects are also intercepted by antenna 33 and are supplied through T-R box 32 to the receiver circuits of the radar system, comprising converter and intermediate frequency amplifier 34.

T-R box 32 is a conventional device, well known in the radar art, for the purpose of alternately permitting the passage of energy from oscillator 31 to antenna 33, and of received energy from antenna 33 to converter and I.-F. amplifier 34, while minimizing the amount of energy from the magnetron oscillator reaching the receiver circuits, so as to prevent interference with the operation of the latter and possible destruction of certain of their delicate components. In one of its usual forms this device may comprise a resonant discharge path enclosed in an evacuated envelope, the discharge path being connected effectively in series with the energy transmission channel from the transmitter to the antenna and in shunt with that from the antenna to the receiver, preferably at a point where the two join. The discharge path is arranged so as to conduct in response to large bursts of energy to the transmitter but not in response to relatively smaller amounts of energy proceeding from the antenna toward the receiver.

The converter section of converter and I.-F. amplifier 34 is adapted to convert the received modulated carrier wave signal to an intermediate carrier frequency suitable for application to the crystal transducer of a supersonic delay tube of the sort just described with reference to Figure 1. This tube together with its associated optical means and photoelectric pickup cell, which may be arranged in the same manner as described with reference to Figure 1, comprises delay means 36 of the arrangement presently being described. The delay produced by these means, as determined by the length of the supersonic delay tube, is made equal to the desired interval between pulses of radio frequency energy to be transmitted by the radar system. The output from the photoelectric cell included in delay means 36 may be supplied to modulator 30 to control the spacing of the control pulses generated thereby. Thus, for example, modulator 30 may be a device, such as a non-oscillating multivibrator, which is capable of generating modulating pulses only in response to triggering pulses supplied to it from the output of delay means 36. Such triggering pulses may comprise the portion of each transmitted pulse which enters the receiver circuits, as delayed in delay means 36. Then modulating pulses will be produced at intervals substantially equal to the delay provided by delay means 36. The output from delay means 36 is also supplied through an amplifier 37 to a subtractor circuit 38 as in the arrangement according to Figure 1. Also the output of converter and I.-F. amplifier 34 is supplied to detector 39 from which is derived an undelayed signal corresponding to the envelope of the received radar reflection from a given transmitted pulse. In subtractor 38 this undelayed signal is subtracted from the delayed signal from the output of amplifier 37, which corresponds to the next preceding transmitted pulse. The resultant signal is supplied to a suitable indicator 40 which may be the same as that used in any conventional radar system. Whenever the return signals from successively transmitted radar pulses differ, owing for example to the motion of a target within range of the radar, indicator 40 is therefore adapted to provide an indication of such motion.

It will, of course, be understood that the invention is susceptible of embodiment in forms other than the one here shown and described and that it is not limited in its application to any particular class of systems, such as radar target motion indicator systems herein referred to to illustrate its application. Rather it is applicable wherever signals occurring in time-spaced relation are to be delayed for relatively long time intervals, and the scope of the invention is subject only to those limitations imposed by the following claims.

I claim:

1. In a delay device for electrical wave signals; a medium adapted to transmit mechanical compressional waves and comprising at least a region which is light-transmissive and whose light diffractive properties are dependent upon the intensities of compressional disturbances therein; means responsive to input signals which are to be delayed for propagating in said medium, at a point displaced from said region, compressional waves whose amplitude varies in response to said input signals; means for directing light through said region in a direction substantially transverse to the direction of propagation of waves therein; means including a light stop constructed and arranged to intercept at least a portion of the light emerging from said region, the magnitude of the portion so intercepted varying in accordance with the degree of diffraction of said light in response to compressional disturbances in said region; means for focussing light which is not intercepted by said stop to form an image of said region, a second light stop disposed substantially in the plane of said image, said second stop being provided with an aperture of dimensions sufficient only to permit the passage of light which, in traversing said region, comprised a beam of width substantially less than a wavelength of said propagated waves in the direction of their propagation, and means for deriving an output signal which varies in accordance with the variations in light passing said second stop.

2. In a delay device for electrical wave signals; a medium adapted to transmit mechanical compressional waves and comprising at least a region which is light-transmissive and whose light diffractive properties are dependent upon the intensities of compressional disturbances therein; means responsive to input signals which are to be delayed for propagating in said medium, at a point displaced from said region, compressional waves whose amplitude varies in response to said input signals; means for directing light through said region in a direction substantially transverse to the direction of propagation of waves therein; means including a light stop interposed in the path of light emerging from said region, said last-named means being constructed and arranged so as normally to intercept substantially all of said emergent light in the absence of compressional disturbances in said region, but being adapted to permit the passage of light diffracted in response to compressional disturbances in said region; means for focussing said diffracted light to form an image of said region in a plane displaced from said stop; a second light stop disposed substantially in the plane of said image, said second stop being provided with a slit of width sufficient to permit it to pass only light which has traversed a predetermined portion of said region whose dimension in the direction of propagation of said waves is substantially less than a wavelength of said propagated waves; and means responsive to light passing said second stop for deriving delayed versions of said input signals.

3. In a delay device for electrical wave signals, a medium adapted to transmit mechanical compressional waves and comprising at least a region which is light-transmissive and whose light diffractive properties are dependent upon the intensities of compressional disturbances therein, means responsive to input signals which are to be delayed for propagating in said medium, at a point displaced from said region, compressional waves whose amplitude varies in response to said input signals; means for directing light through said region in a direction substantially transverse to the direction of propagation of waves therein and in a beam whose dimension in the direction of propagation of said waves is substantially greater than a wavelength of said propagated waves; a light stop interposed in the path of said beam at a point subsequent to the emergence of said beam from said region, the dimension of said stop being substantially less than the dimension of said beam in the direction of propagation of said waves; means for focussing said light emergent from said region to cause a substantial portion thereof to be intercepted by said stop, the magnitude of said portion being subject to variation in accordance with the degree of diffraction of said light in response to compressional disturbances in said region; means for focussing light which is not intercepted by said stop to form an image of said region, means disposed substantially in the plane of said image for selecting light which, in traversing said region comprised a beam of width substantially less than a wavelength of said propagated waves in the direction of their propagation, and means for deriving an output signal which varies in accordance with the variations in said selected light.

ARTHUR H. MANKIN.

REFERENCES CITED

The following references are of record in the file of this patent:

UNITED STATES PATENTS

| Number | Name | Date |
| --- | --- | --- |
| 1,678,653 | Schroter | July 31, 1928 |
| 1,694,661 | Meissner | Dec. 11, 1928 |
| 2,155,659 | Jeffree | Apr. 25, 1939 |
| 2,155,661 | Jeffree | Apr. 25, 1939 |
| 2,287,587 | Willard | June 23, 1942 |
| 2,418,964 | Arenberg | Apr. 15, 1947 |
| 2,422,135 | Sanders, Jr. | June 10, 1947 |